Nov. 17, 1925.
J. W. RICHMAN
MECHANICAL TOY
Filed Jan. 3, 1925
1,561,665
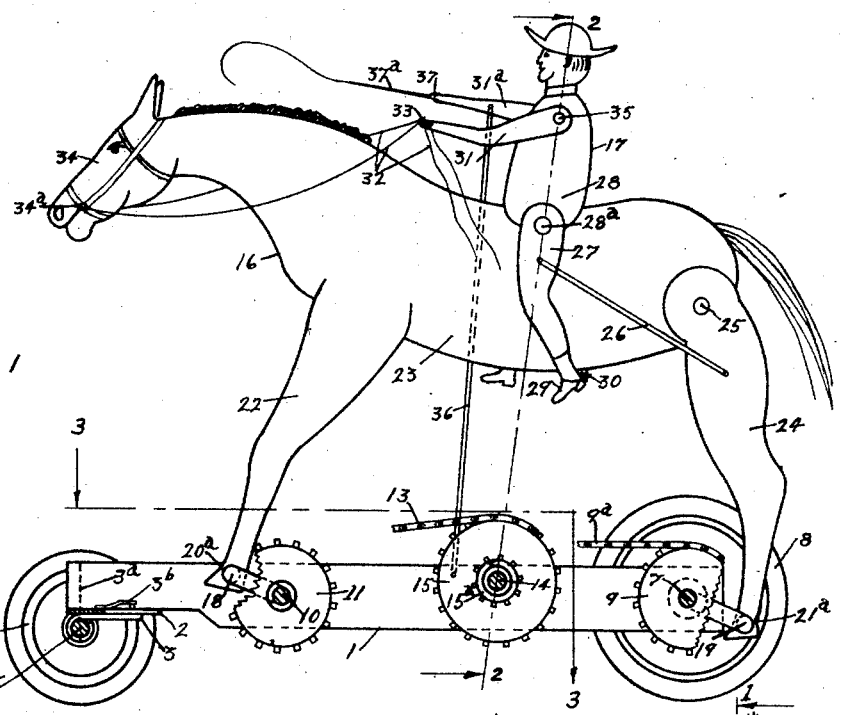
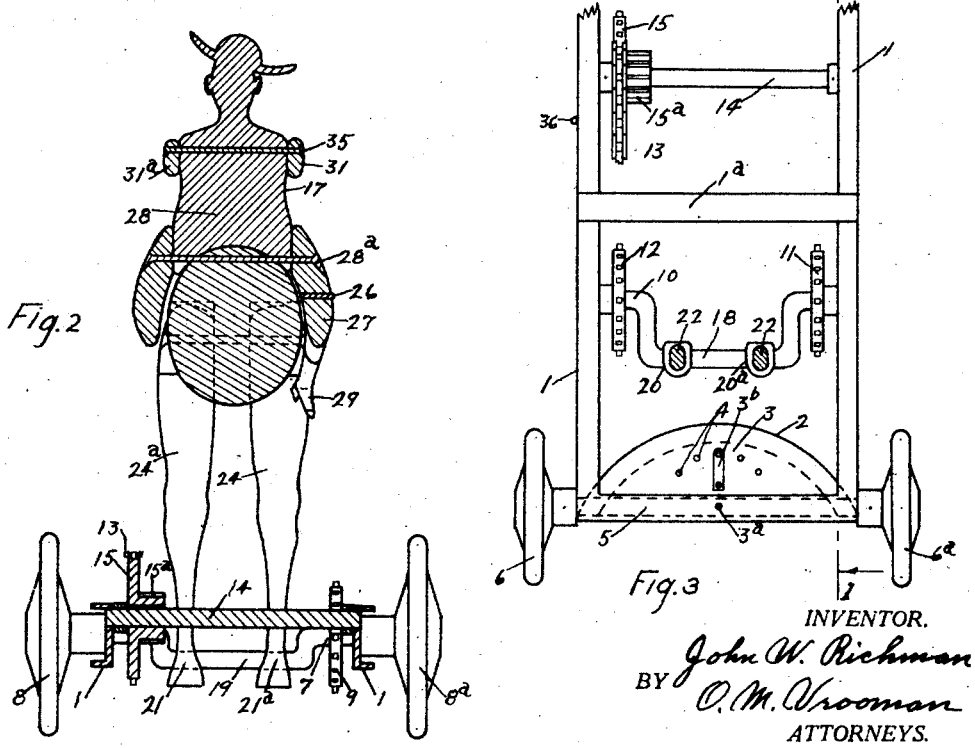
INVENTOR.
John W. Richman
BY O. M. Vrooman
ATTORNEYS.

Patented Nov. 17, 1925.

1,561,665

UNITED STATES PATENT OFFICE.

JOHN W. RICHMAN, OF SAN JOSE, CALIFORNIA.

MECHANICAL TOY.

Application filed January 3, 1925. Serial No. 341.

To all whom it may concern:

Be it known that I, JOHN W. RICHMAN, a citizen of the United States, residing at San Jose, in the county of Santa Clara and State of California, have invented a new and useful Improvement in Mechanical Toys, of which the following is a specification.

My invention relates to mechanically operated toys in general but more particularly to toys of the automaton type and it has for its objects first to provide a toy in which the automaton is operated simultaneously with the locomotion of the toy.

Second, to provide a toy in which the general shape of the automatons and the motions thereof are comical.

Third, to provide a toy that can be easily and cheaply constructed.

With these and other objects in view the invention resides in certain novel features of construction and in the unique arrangement of parts to be hereinafter more fully described and claimed, it being understood that various changes in form, proportion and minor details of construction may be resorted to within the scope of the appended claims.

For a full understanding of the invention and the merits thereof, reference is to be had to the accompanying drawings forming part of this specification and in which similar reference characters indicate corresponding parts in all the views.

Figure 1 is a side elevation, parts broken away as indicated on line 1—1 of Figure 3.

Figure 2 is a sectional view as indicated on line 2—2 of Figure 1.

Figure 3 is a sectional view as indicated on line 3—3 of Figure 1, parts broken away.

My improvement in mechanical toys forming the subject matter of the present invention consists of the frame 1 formed of suitable material such as sheet metal; a cross brace is shown at $1^a$.

On the lower side of the front end of frame 1 there is provided a sheet metal plate 2 secured to frame 1 in any suitable manner and forming a bearing for the turntable 3 turnable about the king pin $3^a$ and held in adjusted positions by spring catch $3^b$ which engages the aligned openings 4 in plate 2 and turntable 3.

Secured to the lower side of turntable 3 is the front axle 5 carrying the front ground wheels 6—$6^a$ turnable thereon, and turnably mounted through the rear end of frame 1 is the rear crank axle 7 carrying ground wheels 8—$8^a$, ground wheel 8 being turnably mounted on crank axle 7 while ground wheel $8^a$ is secured rigid thereto; also keyed or otherwise rigidly secured to rear crank axle 7 is the sprocket wheel 9 adapted to engage sprocket chain $9^a$. Turnably mounted through the frame 1 a distance back from the front end thereof is the crank axle 10 carrying sprocket wheels 11 and 12 keyed or otherwise rigidly fastened thereto; sprocket wheel 11 being adapted to engage sprocket chain $9^a$ so as to cause rear crank axle 7 and crank axle 10 to rotate in unison, thus keeping the offsets of said crank axles in set relation to each other, sprocket wheel 12 being adapted to engage sprocket chain 13.

A drive shaft is shown at 14 turnably mounted through the frame 1 a distance to the rear of crank axle 10; secured rigid to the shaft 14 is the sprocket wheel 15 carrying the pinion gear $15^a$, said sprocket wheel 15 engaging sprocket chain 13 thus holding crank axle 10 and drive shaft 14 in geared relation to each other.

The pinion gear $15^a$ is provided for the purpose of engaging a gear wheel of a suitable driving power such as a spring clock work which may be mounted to frame 1 in any suitable manner. The gear wheel and driving power not being shown.

Mounted upon the running gear crank axles 7—10 is the automaton 16 made to resemble a horse with bridle galloping and upon which sits a second automaton 17 made to resemble a man with reins in hand whipping and spurring the automaton 16. The automatons 16—17 may be made of any suitable material, I have shown them constructed solid but they can as well be hollow and of pressed metal. The automaton 17 is rigidly secured to the automaton 16 in any suitable manner. The automaton 16 is attached to the crank axle offsets 18—19 by means of suitable bearings 20—$20^a$ and 21—$21^a$ in the feet of said automaton and are turnable on said crank axle offsets 18—19.

The front legs 22 of the automaton 16 are rigidly secured to the body 23 while the rear legs 24—24ª are pivotedly mounted to body 23 by means of shaft 25 which passes through the body 23 and forms a pivot for the rear legs 24—24ª and are held thereon by heading over the ends of said shaft.

Pivotedly attached to the rear leg 24 a distance down from the shaft 25 is the connecting rod 26 which connects with the leg 27 of the automaton 17 and is pivoted thereto; the leg 27 is pivotedly attached to the body 28 by shaft 28ª.

On the foot 29 of leg 27 is shown the miniature horseman's spur 30 which may be made of any suitable material and rigidly attached to said foot 29. Arms are shown at 31—31ª attached to body 28, arm 31 carries the reins 32 in the hand 33, said reins may be of wire or other suitable material and are attached to each side of the head 34 at the mouth 34ª in any suitable manner such as by screws or rivets.

Arm 31ª is pivotedly attached to the body 28 by means of a shaft 35 upon which said arm turns and is held thereon by heading over the end of shaft 35. A connecting rod is shown at 36 which is pivoted to the arm 31ª a short distance from the shaft 35 and connects to the frame 1 to which it is also pivotedly attached. In the hand 37 of the arm 31ª is shown a whip 37ª held rigid therein same being constructed of wire or other suitable semi flexible material.

The operation of my improved mechanical toy is as follows:—

When suitable driving power is applied to the pinion gear 15ª is caused to rotate counter clockwise and being connected by sprocket chain 13 to sprocket wheel 11 causes crank axle 10 to rotate.

Crank axle 10 and crank axle 7 being connected to each other by sprocket chain 9ª causes these crank axles to rotate together.

Crank axle 7 having a ground wheel 8ª secured rigid thereto causes the toy to be propelled forward. By means of the adjustable turntable the toy may be set to travel in various sized circles or it may be set to go straight forward.

While the crank axles are being rotated, the automaton 16 is given a motion resembling that of a horse galloping and as the rear legs 24—24ª go through their cycle of operations, the leg 27 of the automaton 17 is, by means of the connecting rod 26, given a motion resembling that of spurring or kicking the automaton 16, also as the automaton 16 changes its position in regard to the frame 1, the arm 31ª of automaton 17 is, by means of the connecting rod 36, given a motion resembling that of striking the automaton 16 with the whip 37ª.

It will be seen also that the toy may be drawn with a suitable cord and that the automatons will go through the cycle of operations just the same.

Having thus described my invention what I claim as new and desire to secure by Letters Patent is:—

1. In a mechanical toy of the class described, a frame, a turntable adjustably mounted on front end of said frame, means for holding said turntable in adjusted position, a front axle secured to said turntable, ground wheels turnably mounted on said axle, a rear crank axle turnably mounted through said frame; a ground wheel secured rigid to said crank axle and a second ground wheel turnable on said axle; a second crank axle turnably mounted through said frame near the front end thereof and turnable in unison with the first mentioned crank axle; a power shaft; means for keeping said second mentioned crank shaft in geared relation to the power shaft; an automaton, resembling a horse, mounted on said crank axles and positioned above said frame; bearings in the feet of said automaton by which it is mounted to said crank axles; means whereby the automaton can accommodate itself to the cycle of the crank axles; a second automaton, resembling a man, secured rigid to said first mentioned automaton; a movable leg on said second mentioned automaton; a movable arm on said second mentioned automaton and means for moving said leg and arm when the first mentioned automaton and crank axles are in motion, substantially as shown and described.

2. In a mechanical toy of the class described, the combination with a frame having ground wheels and adapted to be self propelled of crank axles turnably mounted through said frame one near the front and one in the rear thereof; means for keeping said crank axles in fixed relation to each other; a power shaft turnably mounted through said frame; means for gearing the power shaft to one of said crank shafts; an automaton resembling an animal mounted on the offsets of said crank axles and positioned above said frame; a second automaton secured rigid to the first mentioned automaton; pivoted rear legs attached to the first mentioned automaton; a pivoted leg on the second mentioned automaton; a pivoted arm on the second mentioned automaton and means whereby said arm and leg are moved when the first mentioned automaton and frame are in motion substantially as set forth.

3. In a mechanical toy of the class described, a frame having ground wheels turnably mounted thereon; an adjustable turntable for setting the frame to run in predetermined directions; a rear crank axle rotated by one of said ground wheels; a second crank axle positioned a distance to the front from the first mentioned crank axle and chain driven from the first mentioned crank axle; an automaton, resembling an animal, mounted by means of the feet thereof on the offsets of the crank axles and positioned above said frame; rear legs pivotedly attached to the automaton whereby the automaton can assume the position of galloping; a second automaton seated upon the back of the first mentioned automaton; a leg pivotedly attached to the second mentioned automaton; an arm pivotedly attached to the second mentioned automaton and means for causing said arm and leg to move when the first mentioned automaton and the frame are in motion substantially as shown and described.

In testimony whereof I hereby affix my signature.

JOHN W. RICHMAN.